United States Patent [19]
Pruitt

[11] Patent Number: 5,966,936
[45] Date of Patent: Oct. 19, 1999

[54] PIN COUPLING FOR REDUCED SIDE LOADS IN A DRIVEN DISPLACER-PISTON LINK AND METHOD

[75] Inventor: Gerald R. Pruitt, San Pedro, Calif.

[73] Assignee: Raytheon Company, Lexington, Mass.

[21] Appl. No.: 09/090,196

[22] Filed: Jun. 4, 1998

[51] Int. Cl.⁶ .................................................. F01B 29/10
[52] U.S. Cl. ............................................. 60/520; 92/187
[58] Field of Search ..................... 60/517, 520; 92/187, 92/165 R; 384/11

[56] References Cited

U.S. PATENT DOCUMENTS

| | | | |
|---|---|---|---|
| 3,161,185 | 12/1964 | Justinien et al. ........................ | 92/187 X |
| 3,968,736 | 7/1976 | Pecorari ................................ | 92/165 R |
| 5,088,289 | 2/1992 | Mita et al. ............................. | 60/520 X |
| 5,101,635 | 4/1992 | Mita et al. ............................. | 60/520 X |

*Primary Examiner*—Hoang Nguyen
*Attorney, Agent, or Firm*—Colin M. Raufer; Leonard A. Alkov; Glenn H. Lenzen, Jr.

[57] ABSTRACT

A driven armature cylinder and piston link with reduced side loads and cross-bearing loads which uses a pin inserted through a dual coaxial tapered through bore in the drive piston to secure a drive piston to a displacer or compressor module cylinder, as applicable to Stirling cycle cryocoolers. Another embodiment is a method of coupling a piston to an armature cylinder with a linkage pin inserted through a dual coaxial tapered through bore to assure that the impact forces between the linkage pin and the drive piston occur at the centerline of the drive piston for centered loading and reduction of side and cross-bearing loads.

9 Claims, 1 Drawing Sheet

PIN COUPLING FOR REDUCED SIDE LOADS IN A DRIVEN DISPLACER-PISTON LINK AND METHOD

FIELD OF THE INVENTION

The present invention relates generally to the field of couplings, and in particular to pin couplings connecting drive pistons to armature cylinders, such as displacers and compressors of Stirling cycle cryocoolers.

BRIEF DESCRIPTION OF THE PRIOR ART

Stirling cycle cryocoolers include a reciprocating compressor module and an expander module with a displacer placed in a cold finger which is removed from the compressor module. Generally, in these devices a fluid, such as helium, is initially cooled under high pressure by passing through a regenerator and finally cooled through expansion and discharge. The compressor and the displacer modules each have at least one drive piston.

The drive piston of the compressor module is mechanically driven to provide a pressure variation in the pressurized refrigeration fluid. As a motor moves the drive piston, the piston acts to compress and expand the fluid and the pressure wave is transmitted through a supply line to the displacer. The high pressure creates a pressure differential across the displacer. With the movements of the displacer's drive piston, high pressure fluid is forced through a regenerator which absorbs heat and reduces temperature of the fluid. Both the compressor and the expander module have to be carefully balanced and the vibration level kept low in order to obtain a near perfect balance of all active forces, such as pressure forces, motor electromechanical forces, dynamic reaction of the moving masses, etc.

Some compressor and displacer modules use clearance seals between each drive piston and the compressor or displacer cylinder liner, often with springs used to maintain the alignment of the drive piston to the displacer or compressor liner. Some drive pistons in displacers of cryogenic coolers are coupled to the displacer clearance seal with a linkage pin. The linkage pin is received through an oversized through hole, that provides alignment clearance for the mating linkage pin, which has sufficient clearance to allow for manufacturing misalignment tolerances. However, misalignments that exceed the surface roughness of the mating linkage pin and through hole, typically 16 millionths of an inch or less, will result in the linkage pin to contact the drive piston at the edge of the mating through hole instead of at the center of the through hole, which impacts the loading.

The fluid flow losses through the displacer cause the displacer to be driven by forces that are out of phase with the forces from the drive piston. This results in the displacer and the linkage pin affixed therewith to separate from the mating drive piston until the clearance at the linkage pin interface with the displacer has been traversed. The displacer/pin assembly therefore impacts the mating drive piston and significant side loads can result. Since these loads on the drive piston are at the edge of the drive piston, the result is a moment that is borne by the drive piston sleeve. A similar moment results at the displacer clearance seal sleeve that mates with the displacement clearance seal on the displacer assembly. The resulting cross-bearing loads lead to wear on the drive piston and displacer clearance seal.

SUMMARY OF THE INVENTION

One aspect of the present invention is a pin coupling of a driven armature cylinder and piston link, wherein the link has a piston, an armature cylinder around the piston and an armature clearance seal insertable in the armature cylinder. The pin coupling consists of a through hole transverse to a longitudinal axis of the piston, which extends the full width of the piston at one end of the piston, and a linkage pin receivable in the through hole and attachable to the armature clearance seal to controllably couple the piston to the armature clearance seal. The through hole is preferably a dual coaxial tapered bore which allows impact forces between the linkage pin and the piston to occur approximately at a midpoint of the linkage pin and the longitudinal axis of the piston, in order to reduce dynamic side loads on the armature cylinder, armature clearance seal, and the piston.

Another aspect of the present invention is a driven armature cylinder and piston link which consists of a piston which on its one end has a through hole transverse to a longitudinal axis of the piston which extends the full width of the piston, an armature cylinder which has a cylindrical longitudinal opening through a center thereof along a longitudinal axis which extends concentrically about the piston, an armature clearance seal insertable in the armature cylinder, and a linkage pin receivable in the through hole and attachable to the armature clearance seal to controllably couple the piston to the armature clearance seal. The through hole is a dual coaxial tapered bore which allows impact forces between the linkage pin and the piston to occur approximately at a midpoint of the linkage pin and the longitudinal axis of the piston, in order to reduce dynamic side loads and cross-bearing loads on the armature cylinder, armature clearance seal, and the piston.

The dual coaxial tapered bore preferably consists of an upper tapered portion which has a downwardly tapered frustoconical bore, and a lower tapered portion which has an upwardly tapered frustoconical bore, formed in the through hole, disposed on a same axis as the upper tapered portion, to support and align the linkage pin. The tapered portions are adjacent to and communicate with each other at their narrow surfaces to provide a contact surface approximately at the midpoint of the linkage pin and the longitudinal axis of the piston to retain the linkage pin and enable the piston to remain in alignment with the armature cylinder along the armature clearance seal in order to reduce radial forces, side loads and cross-bearing loads exerted on the armature clearance seal and the piston. The invention is applicable to a displacer and a compressor cylinder of a Stirling cycle cryocooler.

Yet another aspect of the present invention is a method of coupling a piston to an armature cylinder, wherein the armature cylinder has an armature clearance seal inserted within, to provide centered loading and reduction of side and cross-bearing loads. The method provides a through hole transverse to a longitudinal axis of the piston, which extends the full width of the piston at one end of the piston and secures the piston to the armature cylinder with a linkage pin, receivable in the through hole and attachable to the armature clearance seal. The through hole is preferably a dual coaxial tapered bore.

The foregoing and additional features and advantages of this invention will become further apparent from the detailed description and accompanying drawing figures that follow. In the figures and written description, numerals indicate the various features of the invention, like numerals referring to like features throughout for the drawing figures and the written description.

DETAILED DESCRIPTION OF THE INVENTION

The present invention relates to a driven armature cylinder and piston link with reduced side loads and cross-bearing loads. The illustrated embodiment uses a pin coupling through a dual coaxial tapered bore to secure a drive piston to an armature cylinder, and is applicable to displacer or compressor modules of Stirling cycle cryocoolers. Another embodiment is a method of coupling a piston to an armature cylinder with a linkage pin inserted through a dual coaxial tapered bore to provide centered loading and reduction of side and cross-bearing loads.

Figure 1:
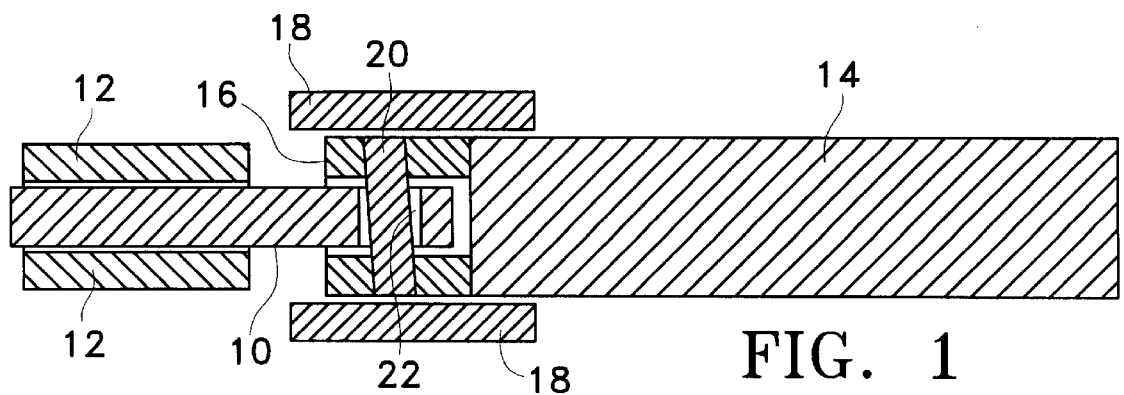
FIG. 1 is a schematic illustration of a conventional cryogenic cooler displacer and drive piston coupling.

A compressor of a Stirling cycle cryocooler is connected to a cold finger with a displacer. FIG. 1 presents a schematic illustration of a conventional cryogenic cooler displacer drive piston 10, a displacer 14 with a cylindrical longitudinal opening which extends concentrically about the drive piston 10 and along which the displacer driver piston 10 reciprocates, and a coupling between them. The drive piston 10 has a through hole 22 at its one end, which is transverse to a longitudinal axis of the drive piston 10 and extends the full width of the piston and provides alignment clearance for a mating linkage pin 20. The drive piston 10 is encircled with a drive piston sleeve 12. The displacer 14 is encircled with a displacer clearance seal sleeve 18. The coupling consists of the linkage pin 20, extended in the through hole 22, which is attached to a displacer clearance seal 16, placed inside the displacer 14 and moves together with the drive piston 10. The coupling has to be radially aligned to balance radial forces and reduce radial loads exerted on the displacer clearance seal 16 by the displacer drive piston 10. The illustrated invention is also applicable to compressor modules, not shown, which also use drive piston pin couplings and need reduced dynamic loads on clearance seals formed with cylinders in which drive pistons reciprocate.

The linkage pin 20 can be formed by machining a portion of a cylindrical rod to the appropriate dimensions. The linkage pin 20 operates to retain the drive piston 10 along a linear path and tends to urge the drive piston 10 into alignment with the longitudinal axis of the displacer 14 to prevent cross-bearing forces exerted along the displacer clearance seal 16 and insure even loading along the displacer clearance seal 16. However, in conventional systems the through hole 22 is oversized which causes misalignments that exceed the surface roughness of the mating linkage pin 20 and the through hole 22, typically greater than 16 millionths of an inch over the constant length. This results in the linkage pin 20 contacting the drive piston 10 at the edge of the mating through hole 22 instead of at the center of the through hole 22, which increases wear and reduces the lifetime of the drive piston 10.

Figure 2:
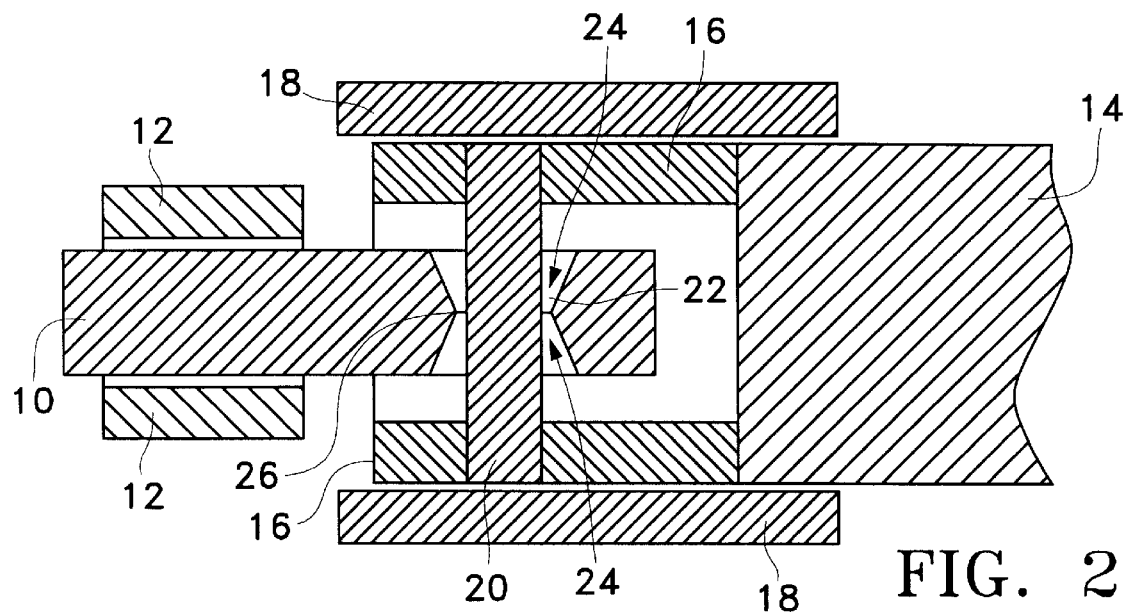
FIG. 2 is a schematic illustration showing cryogenic cooler displacer and drive piston coupling of the present invention.

In the specific embodiment of the invention, as shown in FIG. 2, the surface of the through hole 22 of the drive piston 10, that provides alignment clearance for the mating linkage pin 20, is tapered on both sides to provide a contact surface approximately at a centerline 26 of the drive piston 10, which is located on piston's longitudinal axis. Therefore, the through hole 22 is preferably a dual coaxial tapered bore which allows impact forces between the linkage pin 20 and the drive piston 10 to occur approximately at a midpoint of the linkage pin 20 and at the longitudinal axis of the drive piston 10 in order to reduce dynamic side loads and cross-bearing loads.

The dual coaxial tapered bore has an upper tapered portion 24 with a downwardly tapered frustoconical bore and a lower tapered portion 24 with an upwardly tapered frustoconical bore formed in the through hole 22, both disposed on the same axis. The two tapered portions 24 are adjacent to and communicate with each other at their narrow surfaces to provide the contact surface at the midpoint of the linkage pin 20 and the longitudinal axis of the piston 10, to retain the linkage pin 20 and enable the drive piston 10 to remain in alignment with the displacer 14 along the clearance seal 16 in order to reduce radial forces and side loads and cross-bearing loads exerted on the clearance seal 16 and the drive piston 10. The contact surface is preferably very thin and consists of a single contact line.

The resulting dual coaxial tapered bore is preferably made of two tapered portions 24 which have identical depth and angle. Therefore, the point of contact with the linkage pin 20 is at the contact surface of the two tapered portions 24 of the through hole 22 at the centerline 26 of the drive piston 10, as long as the angle of the tapered portion 24 exceeds the cumulative angular misalignment of the displacer 14 and linkage pin 20 assembly.

The through hole 22 surface of the drive piston 10, that provides alignment clearance for the mating linkage pin 20, assures that impact forces between the linkage pin 20 and the drive piston 10 occur at the centerline 26 of the drive piston 10. The novel design eliminates moments associated with off-axis impact on the through hole 22 of the drive piston 10 associated with microscopic misalignment of the linkage pin 20 to the mating through hole 22. Elimination of the off-axis moment results in elimination of corresponding cross-bearing loads on the drive piston 10 as well as on the displacer clearance seal 16. Elimination of cross-bearing loads associated with off-axis moment significantly reduces dynamic wear on the moving drive piston 10 and displacer clearance seal 16 surfaces, as well as attendant particulate wear debris that can impact overall performance. Due to the proper alignment of the linkage pin 20 the energy of impact is reduced, resulting in reduced dynamic loads and increased wear life of the mating parts.

Additionally, the invention results in the impact taking place approximately at the midpoint of the linkage pin 20. Therefore, compliance of the linkage pin 20 is maximized, allowing the linkage pin 20 to absorb more of the energy of impact, thereby reducing the peak impact force attained.

Analysis based on a Stirling cycle cryocooler expander design using a conventional linkage pin 20—through hole 22 coupling indicates that impact forces incurred during reversal of motion reach levels up to 39.6 lbs, with corresponding side loads on the drive piston 10 and displacer clearance seal 16, due to the off-axis moment, of 3.8 lb and 5.5 lb respectively. Analysis based on the illustrated embodiment of the present invention indicates that the impact force is reduced to 24.5 lb and the side loads are eliminated.

The experiments were performed on the dynamic loading device which uses the linkage pin 20—drive piston 10 interface of the present invention. Three cases have been evaluated:

1. Pin coupling with a contact at the centerline of the linkage pin 20 [$\alpha$=0.500, where $\alpha$ is a ratio of location of point of contact with the drive piston 10 to the total unsupported length of the linkage pin 20],
2. Pin coupling with a contact offset by 0.019" from the centerline of the linkage pin 20 (nominal point of contact of the drive piston 10 if any misalignment exists between the linkage pin 20 and the drive piston 10) [α=0.2761], and 3. Pin coupling with a contact offset by 0.025" from the centerline of the linkage pin 20 (extreme point of contact of the drive piston 10 if any misalignment exists between the linkage pin 20 and the drive piston 10) [α=0.205].

The experiment used the following equations and parameter values:

pneumatic pressure loads on the drive piston 10 of $$P_{pneum} = \Delta P_{pneum} \sin(2\pi f t)$$

where $P_{pneum}$ is a pressure difference across the drive piston 10 between operating volume and pneumatic volume, $\Delta P_{pneum}$ is a pressure wave peak of 75 psi, f is an operating frequency of 25 Hz, pressure drop across the displacer 14 lags compressor output pressure wave by a phase angle $\phi$ $$P_{disp} = \Delta P_{disp} \sin(2\pi f t + \phi)$$

where $P_{disp}$ is a pressure differential across the displacer 14 due to flow losses in regenerator and pressure drop across the displacer clearance seal 16, $\Delta P_{disp}$ is a pressure wave peak of 10 psi, and $\phi$ is a phase angle of 30 degrees, pneumatic force on the drive piston 10 of $$F_{pneum} = P_{pneum} A_{piston}$$

where $A_{piston}$ is a cross-section area of the drive piston 10 of $0.25\pi D_{piston}^2$, and $D_{piston}$ is a diameter of the drive piston 10 of 0.070 in, pressure drop force on the displacer 14 of $$F_{disp} = P_{disp} A_{disp}$$

where $A_{disp}$ is a cross-section area of the displacer 14 of $0.25\pi D_{disp}^2$ and $D_{disp}$ is a diameter of the displacer 14 of 0.187 in, motion of the drive piston 10 and displacer 14 is initially presented by the equation $$(m_{piston} + m_{disp}) d^2x/dt^2 = F_{pneum} - F_{disp}$$

where $m_{piston}$ is a mass of the drive piston 10 of $6.12 \times 10^{-4}$ lbm, and $m_{disp}$ is a mass of the displacer 14 of $1.06 \times 10^{-2}$ lbm, when velocity of the drive piston 10 and displacer 14 becomes zero, motion equations can be presented as $$F_{pneum} = (m_{piston}) d^2x/dt^2$$

$$F_{disp} = (m_{disp}) d^2x/dt^2$$

after the relative motion of the displacer 14 to the drive piston 10 exceeds the linkage pin 20 clearance of 0.002", the stopping force of the linkage pin 20 is presented with the equation $$F_{pin} = \delta \, 1.5 \, E \, I (3\alpha + \beta)^2 / (\alpha^3 \beta^2 L^3)$$

as is shown in Roark, Table III, Formulas for Stress & Strain, 4th Ed.

Figure 3:
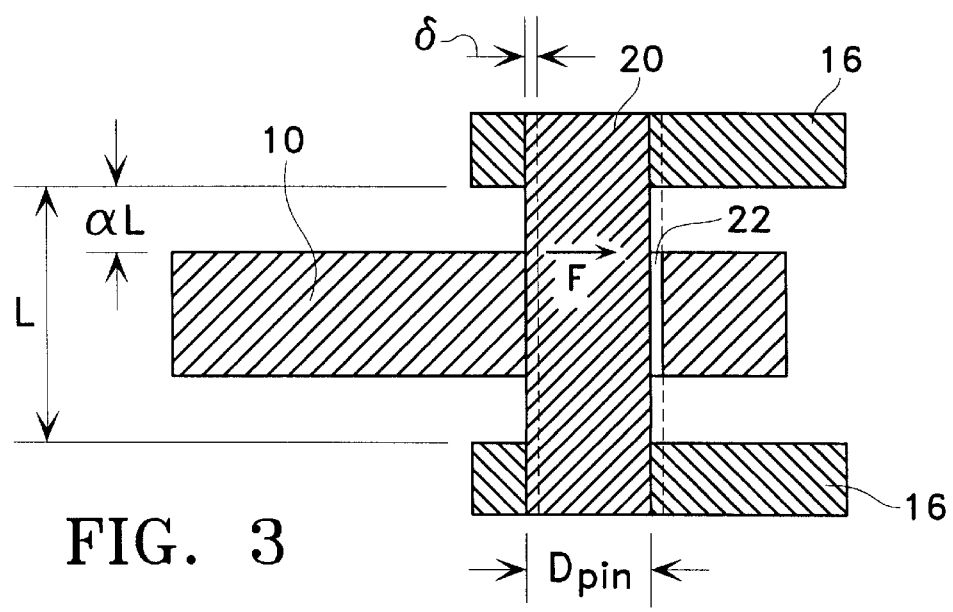
FIG. 3 is a simplified schematic illustration of the device of FIG. 2, showing the design parameters.

FIG. 3 shows a simplified schematic illustration of the device of FIG. 2 and the design parameters, where:

$\delta$ is a deflection of the linkage pin 20 at the point of contact with the drive piston 10, $\alpha$ is a ratio of the location of point of contact with the drive piston 10 to total unsupported length of the linkage pin 20, $\beta = 1 - \alpha$, L is an unsupported length of the linkage pin 20 of 0.085 in, E is Young's modulus of the linkage pin 20 material of $3 \times 10^7$ psi, I is an area of inertia of the linkage pin $= \pi D_{pin}^4 / 64$, and $D_{pin}$ is the linkage pin 20 diameter of 0.031 in.

The cross-bearing loads that result on the drive piston 10 and the displacer clearance seal 16 can be computed as:

$$F_{piston} = F_{impact} L_{offset} / L_{piston}$$

$$F_{clearance} = F_{impact} L_{offset} / L_{clearance}$$

where $F_{impact}$ is a peak impact force at the linkage pin 20 and drive piston 22 interface, $L_{offset}$ is an offset of the linkage pin 20 contact from the linkage pin 20 center, $L_{piston}$ is a bearing length of the drive piston 10 guide of 0.26 in, $L_{clearance}$ is a bearing length of the displacer clearance seal 16 of 0.180 in, $F_{piston}$ is a cross-bearing load on the drive piston 10 and $F_{clearance}$ is a cross-bearing load on the displacer clearance seal 16.

The results of these analyses, shown in the Table, indicate that after the linkage pin 20 and displacer 14 decouple, the two components attain a relative velocity of 22.0 in/sec before the 0.002" displacement occurs. Depending on the specific case analyzed, the level of a peak impact force at the linkage pin 20—drive piston 22 interface ($F_{impact}$), reached when the relative velocity has been nulled, ranges from a high of 39.6 lb at 0.025" offset, to a low level of 24.5 lb at centered loading. As can be seen in the Table, the side loads of 3.8 lb ($F_{piston}$) and 5.5 lb ($F_{clearance}$), respectively, are eliminated.

TABLE

| CASE | $V_{impact}$ (in/sec) | $L_{offset}$ (in) | $F_{impact}$ (lb) | $F_{piston}$ (lb) | $F_{clearance}$ (lb) |
| --- | --- | --- | --- | --- | --- |
| 1 | 22.0 | 0.000 | 24.5 | 0.0 | 0.0 |
| 2 | 22.0 | 0.019 | 31.6 | 2.3 | 3.4 |
| 3 | 22.0 | 0.025 | 39.6 | 3.8 | 5.5 |

The method of the present invention, which uses the pin coupling with the through hole made as a dual coaxial tapered bore, shows improved coupling life and reduced wear which must be provided in advanced aircraft and spacecraft. The present invention most specifically applies to all Stirling cycle cryocoolers incorporating displacers linked to drive pistons by means of a linkage pin through a through hole. This includes all rotary reciprocating compressor coolers and many of the linear oscillating compressor coolers. Further, the invention is usable for numerous superconductive electronic and electro-optical devices, like sensor detectors, and wherever else reciprocating drive pistons are used.

While this invention has been described with reference to its presently preferred embodiment(s), its scope is only limited insofar as defined by the following set of claims and all equivalents thereof.

I claim:

1. A driven armature cylinder and piston link with reduced side loads and cross-bearing loads, comprising:

a drive piston having at one end a through hole extending transversely through the piston;

a cylindrical clearance seal having an open inner portion extending generally along a longitudinal axis and concentrically about said one end of the piston;

a driven cylindrical armature extending from the clearance seal generally along the longitudinal axis in a direction away from said piston; and a linkage pin receivable in the through hole and attachable to the armature clearance seal for mechanically coupling the drive piston to the armature clearance seal;

wherein the piston, the cylindrical clearance seal and the driven cylindrical armature are aligned about said longitudinal axis within a predetermined angular tolerance;

the through hole is a dual coaxial tapered bore comprising an upper tapered portion having a downwardly tapered frustoconical bore formed in the through hole, and a lower tapered portion having an upwardly tapered frustoconical bore formed in the through hole; and a narrowed portion of the through hole between the upper and lower tapered portions defines a narrow contact surface approximately at the midpoint of the linkage pin and the longitudinal axis of the piston, whereby contact is maintained between the midpoint of the linkage pin and the longitudinal axis of the piston the despite any permissible misalignment between the piston, the linkage pin and the cylindrical armature clearance seal; and whereby any resultant radial forces, side loads, or cross-bearing loads on the armature clearance seal and the piston may be reduced.

2. The driven armature cylinder and piston link as claimed in claim 1, wherein the driven cylindrical armature is a displacer module of a Stirling cycle cryocooler.

3. The driven armature cylinder and piston link as claimed in claim 1, wherein the driven cylindrical armature is a compressor module of a Stirling cycle cryocooler.

4. A pin coupling for reducing side and cross-bearing loads of a driven cylindrical armature and piston link of the type having a drive piston, a cylindrical clearance seal, and a driven cylindrical armature extending from the clearance seal in a direction away from said piston, comprising:

a through hole transverse to a longitudinal axis of the piston and extending transversely through the piston; and a linkage pin receivable in the through hole and attachable to the armature clearance seal for mechanically coupling the drive piston to the armature clearance seal;

wherein the piston, the cylindrical clearance seal and the driven cylindrical armature are aligned about said longitudinal axis within a predetermined angular tolerance; and the through hole is a dual coaxial tapered bore comprising an upper tapered portion having a downwardly tapered frustoconical bore formed in the through hole, a lower tapered portion having an upwardly tapered frustoconical bore formed in the through hole, disposed on a same axis as the upper tapered portion, for supporting and aligning the linkage pin, and a narrowed portion of the through hole between the upper and lower tapered portions defines a narrow contact surface approximately at the midpoint of the linkage pin and the longitudinal axis of the piston; whereby contact is maintained between the linkage pin and the piston despite any permissible misalignment between the piston, the linkage pin and the clearance seal; and whereby any resultant radial forces, side loads, or cross-bearing loads on the armature clearance seal and the piston may be reduced.

5. The pin coupling as claimed in claim 4, wherein the armature cylinder is a displacer module of a Stirling cycle cryocooler.

6. The pin coupling as claimed in claim 4, wherein the armature cylinder is a compressor module of a Stirling cycle cryocooler.

7. A method of coupling a drive piston to a driven cylindrical armature having a cylindrical clearance seal, to provide centered loading and reduction of side and cross-bearing loads, comprising the following steps:

(a) providing a dual coaxial tapered bore through the piston along a transverse axis transverse to a longitudinal axis of the piston; and (b) securing the piston to the armature cylinder with a linkage pin receivable in the through hole and attachable to the armature clearance seal, wherein the dual coaxial tapered bore comprises:

an upper tapered portion having a downwardly tapered frustoconical bore formed in the through hole;

a lower tapered portion having an upwardly tapered frustoconical bore formed in the through hole, disposed on a same axis as the upper tapered portion, for supporting and aligning the linkage pin; and a narrowed portion between the upper and lower tapered portions which defines a narrow contact surface approximately at the midpoint of the linkage pin and the longitudinal axis of the piston; whereby contact is maintained between the linkage pin and the piston despite any permissible misalignment between the piston, the linkage pin and the clearance seal; and whereby any resultant radial forces, side loads, or cross-bearing loads on the armature clearance seal and the piston may be reduced.

8. The method as claimed in claim 7, wherein the armature cylinder is a displacer module of a Stirling cycle cryocooler.

9. The method as claimed in claim 7, wherein the armature cylinder is a compressor module of a Stirling cycle cryocooler.

* * * * *